(12) United States Patent
Sejpal et al.

(10) Patent No.: US 10,496,826 B2
(45) Date of Patent: Dec. 3, 2019

(54) DEVICE BASED AUTOMATED THREAT DETECTION AND RESPONSE

(71) Applicant: Accenture Global Solutions Limited, Dublin (IE)

(72) Inventors: Abhinav Sejpal, Bengaluru (IN); Vijayakrishna Bs, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 310 days.

(21) Appl. No.: 15/438,199

(22) Filed: Feb. 21, 2017

(65) Prior Publication Data
US 2017/0243009 A1    Aug. 24, 2017

(30) Foreign Application Priority Data
Feb. 22, 2016  (IN) .............................. 201641005995

(51) Int. Cl.
*G06F 21/57*    (2013.01)

(52) U.S. Cl.
CPC ...... *G06F 21/577* (2013.01); *G06F 2221/034* (2013.01)

(58) Field of Classification Search
CPC ............. G06F 21/55–56; G06F 21/577; G06F 2221/033–034; H04W 12/12; H04W 12/1201; H04W 12/1204; H04W 12/1208
See application file for complete search history.

(56) References Cited

U.S. PATENT DOCUMENTS

| | | | |
|---|---|---|---|
| 2010/0100964 A1* | 4/2010 | Mahaffey | G06F 21/554 726/25 |
| 2017/0103215 A1* | 4/2017 | Mahaffey | H04L 63/0227 |

* cited by examiner

*Primary Examiner* — Minh Dinh
(74) *Attorney, Agent, or Firm* — Harrity & Harrity, LLP

(57) ABSTRACT

A device may include one or more processors. The device may communicate with a set of user devices operating a set of mobile applications to obtain data regarding a set of malicious attacks associated with the set of user devices. The device may store the data regarding the set of malicious attacks via a data structure for analysis. The device may process the stored data to identify one or more vulnerabilities associated with the set of user devices or the set of mobile applications. The device may generate a security tool user interface that includes information identifying the one or more vulnerabilities associated with the set of user devices or the set of mobile applications. The device may cause the security tool user interface to be provided for display via a client device based on generating the security tool user interface.

20 Claims, 7 Drawing Sheets

DEVICE BASED AUTOMATED THREAT DETECTION AND RESPONSE

RELATED APPLICATION(S)

This application claims priority under 35 U.S.C. § 119 to India Provisional Patent Application No. 201641005995, filed on Feb. 22, 2016, the content of which is incorporated by reference herein in its entirety.

BACKGROUND

A malicious file, such as malicious software ("malware"), may refer to any software used to disrupt computer operations, gather sensitive information, gain access to private computer systems, or the like. A malicious file may include a variety of types of hostile or intrusive software, including a computer virus, a worm, a Trojan horse, ransomware, spyware, adware, scareware, a phishing scam, a keyboard logger, or other malicious software. Increasingly, malicious files are targeted at user devices, such as mobile phones, tablet computers, or the like. User devices may be particularly susceptible to malicious files as a result of relatively low data security, use of connections to public Wi-Fi networks, outdated operating systems, relatively frequent installation of unverified mobile applications, or the like. For example, a malicious file may be included with the installation of an unverified mobile application, and may be utilized by an attacker to gain access to another mobile application operating on a user device and/or to data being stored by the user device.

SUMMARY

According to some possible implementations, a device may include one or more processors. The one or more processors may communicate with a set of user devices operating a set of mobile applications to obtain data regarding a set of malicious attacks associated with the set of user devices. The one or more processors may store the data regarding the set of malicious attacks via a data structure for analysis. The one or more processors may process the stored data to identify one or more vulnerabilities associated with the set of user devices or the set of mobile applications. The one or more processors may generate a security tool user interface that includes information identifying the one or more vulnerabilities associated with the set of user devices or the set of mobile applications. The security tool user interface may include information identifying a risk assessment score relating to the one or more vulnerabilities. The security tool user interface may include information associated with performing one or more response actions to improve the risk assessment score. The one or more processors may cause the security tool user interface to be provided for display via a client device based on generating the security tool user interface.

According to some possible implementations, a method may include configuring, by a device, threat detection and monitoring for a mobile application. The method may include monitoring, by the device, a group of user devices that are using the mobile application to obtain data regarding a set of malicious attacks associated with the group of user devices. The method may include analyzing, by the device, usage of the group of user devices based on monitoring the group of user devices to identify one or more vulnerabilities. The method may include generating, by the device, a security tool user interface including information associated with the usage of the group of user devices based on analyzing the usage of the group of user devices. The security tool user interface may include a set of metrics relating to the one or more vulnerabilities. The method may include causing, by the device, the security tool user interface to be provided for display via a client device based on generating the security tool user interface.

According to some possible implementations, a non-transitory computer-readable medium may store instructions. The one or more instructions, when executed by one or more processors, may cause the one or more processors to configure monitoring of a set of user devices using a mobile application. The one or more instructions, when executed by one or more processors, may cause the one or more processors to communicate with the set of user devices using the mobile application to obtain data regarding a set of malicious attacks associated with the set of user devices. The one or more instructions, when executed by one or more processors, may cause the one or more processors to store the data regarding the set of malicious attacks via a data structure for analysis. The one or more instructions, when executed by one or more processors, may cause the one or more processors to process the stored data to identify one or more vulnerabilities associated with the set of user devices or the mobile application. The one or more instructions, when executed by one or more processors, may cause the one or more processors to generate a security tool user interface that includes information identifying the one or more vulnerabilities associated with the set of user devices or the mobile application. The security tool user interface may include information identifying a risk assessment score relating to the one or more vulnerabilities. The security tool user interface may include information associated with performing one or more response actions to improve the risk assessment score. The one or more instructions, when executed by one or more processors, may cause the one or more processors to cause the security tool user interface to be provided for display via a client device based on generating the security tool user interface.

DETAILED DESCRIPTION

The following detailed description of example implementations refers to the accompanying drawings. The same reference numbers in different drawings may identify the same or similar elements.

A user device may execute a set of mobile applications that are stored by the user device. Malicious attacks may be targeted at the user device and the set of mobile applications to obtain user data and/or private information stored via the user device, stored via an application server associated with a mobile application, or the like. For example, the user device may be a target of a rootkit attack, a structured query language (SQL) injection attack, a cross-site scripting (XSS) attack, or a malicious file (e.g., a computer virus, a worm, a Trojan house, ransomware, spyware, adware, scareware, etc.). However, detection and elimination of malicious attacks fail to provide a mobile application developer with information necessary to reduce a risk of future malicious attacks.

Implementations, described herein, may provide a security user interface including data regarding malicious attacks associated with user devices. Moreover, implementations, described herein, may automatically perform response actions of a generated incident response plan to prevent malicious attacks, correct vulnerabilities to avoid future malicious attacks, or the like. In this way, vulnerabilities may be detected and corrected, thereby reducing a likelihood of success of subsequent malicious attacks relative to remediating malicious attacks without performing further analysis. Implementations, described herein, reduce a utilization of computing resources by user devices by reducing a likelihood that future malicious attacks are successful and cause excess utilization of computing resources by the user devices. Furthermore, implementations described herein reduce a likelihood of malicious data exfiltration as a result of future malicious attacks, thereby reducing a utilization of network resources.

Figure 1A:
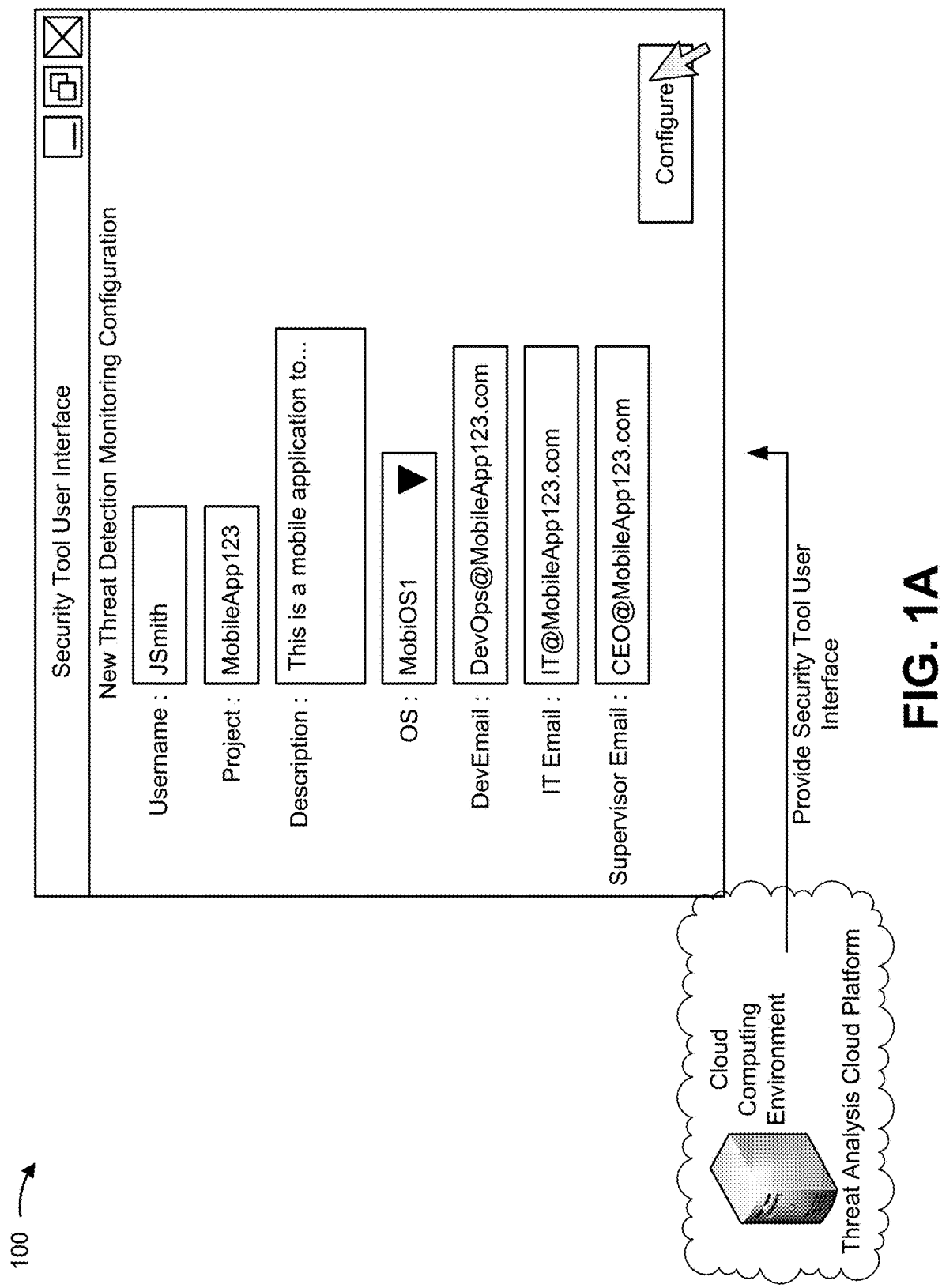
FIGS. 1A-1D are diagrams of an overview of an example implementation described herein.

FIGS. 1A-1D are diagrams of an overview of an example implementation 100 described herein. As shown in FIG. 1A, example implementation 100 includes a threat analysis cloud platform executing in a cloud computing environment. The threat analysis cloud platform provides a security tool user interface for display via a client device (not shown).

As further shown in FIG. 1A, the security tool user interface provides a set of fields to receive information associated with configuring monitoring of a mobile application and/or a group of user devices. For example, the client device may detect a set of user interactions with the security tool user interface associated with identifying a user name of a developer, a project name for the mobile application, a description of the mobile application, an operating system (OS) on which the mobile application is to operate, contact information (e.g., a set of email addresses, a set of user names, a set of employee identifiers, a set of user device identifiers, etc.) for a set of stakeholders associated with the mobile application (e.g., the developer, an information technology (IT) professional, a supervisor, etc.), or the like. Based on detecting a user interaction with the security tool user interface, the threat analysis cloud platform may configure monitoring of the mobile application and/or the group of user devices on which the mobile application is operating.

Figure 1B:
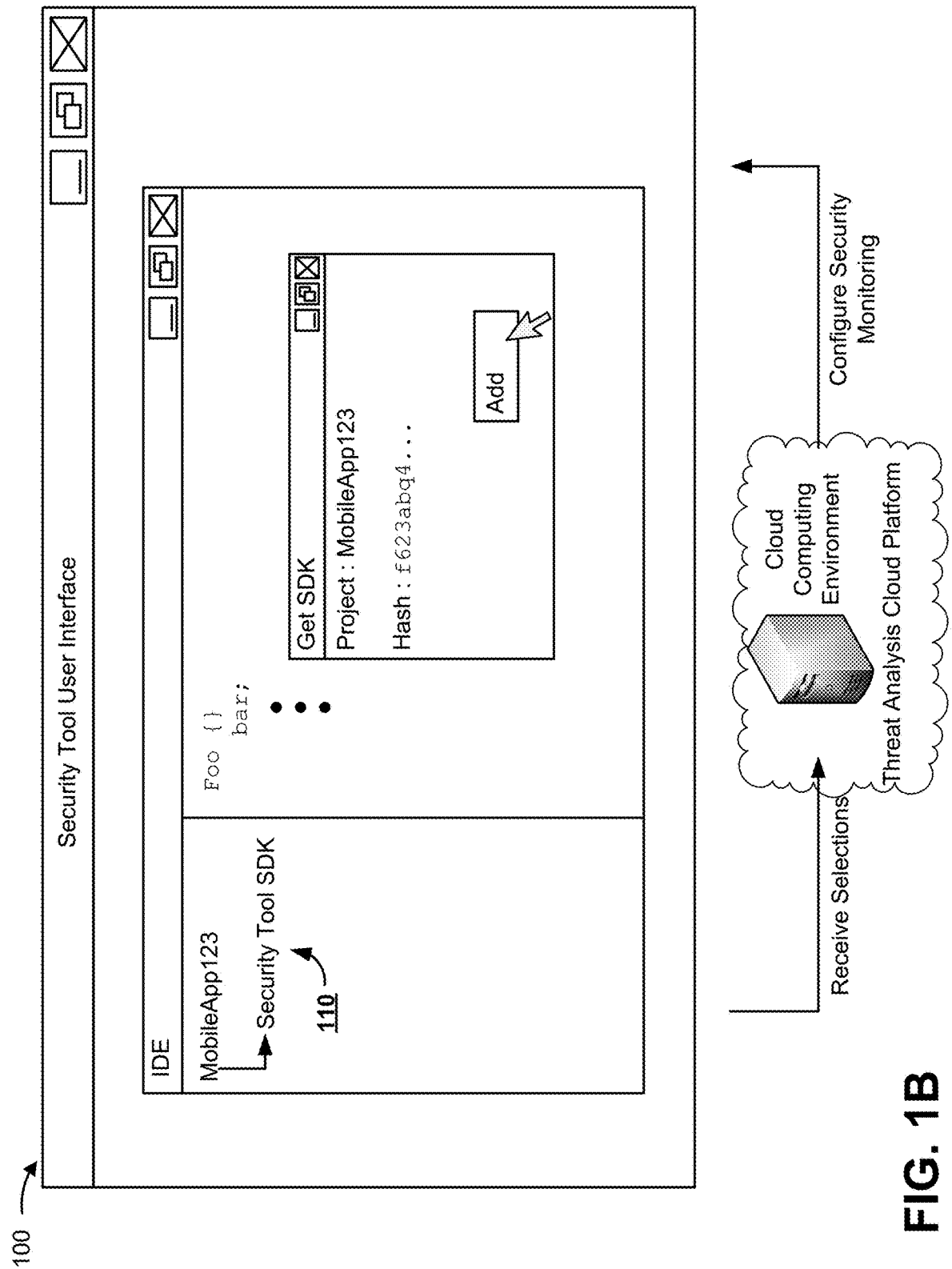

As shown in FIG. 1B, the threat analysis cloud platform may, based on receiving the configuration information, configure security monitoring by generating a secure identifier for the project. The secure identifier may permit the developer to integrate a set of monitoring hooks into program code of the mobile application. For example, the threat analysis cloud platform may generate a hash value based on a portion of the configuration information received via the client device. Based on a user interaction with a user interface element of the security tool user interface, the threat analysis cloud platform may cause a software development kit (SDK) to be downloaded and loaded into an integrated development environment (IDE) associated with the mobile application, as shown by reference number 110. For example, the threat analysis cloud platform may provide, via the SDK, information identifying a set of standards associated with monitoring performed by the security tool user interface, a set of application programming interface (API) calls associated with accessing functionalities of the security tool user interface, or the like. Using information included in the SDK, the developer may release a version of the mobile application that is to be monitored by the threat analysis cloud platform to detect malicious attacks. For example, the developer may release a version of the mobile application that permits the threat analysis cloud platform to monitor utilization of a client device operating the mobile application (e.g., using the secure identifier to obtain secure access to the client device).

Figure 1C:
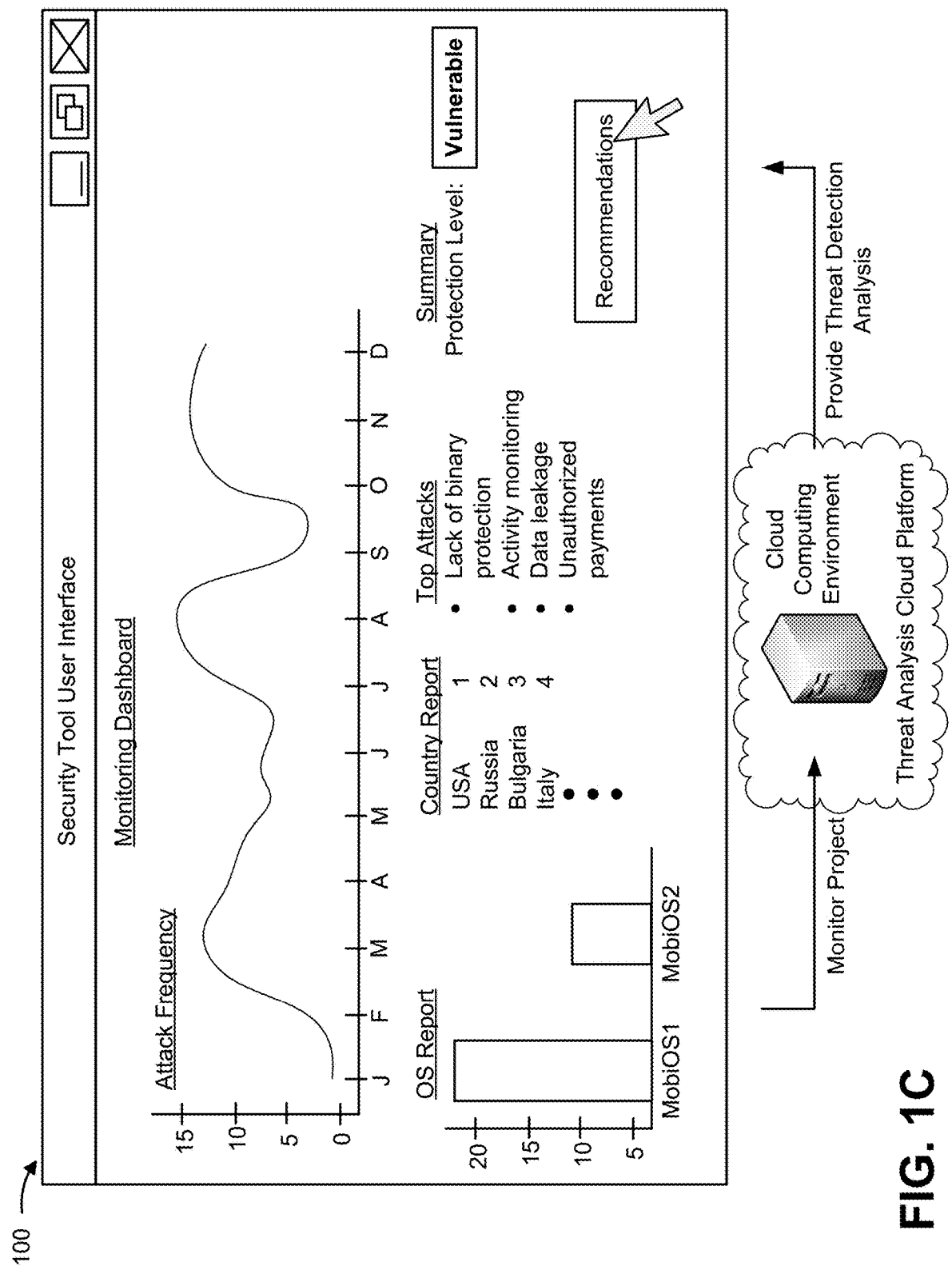

With regard to FIG. 1C, the threat analysis cloud platform may monitor the mobile application and/or a group of user devices operating the mobile application. For example, the threat analysis cloud platform may utilize a set of hooks to monitor and/or intercept a set of function calls, events, messages, and/or the like associated with the group of user devices. In some implementations, the threat analysis cloud platform may receive information regarding a set of malicious attacks associated with a subset of user devices of the group of user devices. In some implementations, the threat analysis cloud platform may classify the set of malicious attacks based on the information. For example, the threat analysis cloud platform may classify the malicious attacks based on a channel for a malicious attack, a particular malicious attacker, or the like. In some implementations, the threat analysis cloud platform may obtain historical malicious attack data to categorize the malicious attacks. For example, the threat analysis cloud platform may obtain stored information (i.e., thousands, millions, billions, or trillions of data points) regarding previous malicious attacks to categorize malicious attacks associated with the mobile application. In some implementations, the threat analysis cloud platform may generate the security tool user interface to include a monitoring dashboard, and may provide the monitoring dashboard for display via the client device.

As shown in FIG. 1C, the monitoring dashboard may include threat detection analyses regarding the malicious attacks. For example, the monitoring dashboard may include information identifying a frequency of malicious attacks detected by the threat analysis cloud platform over time. Additionally, or alternatively, the monitoring dashboard may include information identifying a quantity of malicious attacks identified for each type of operating system on which the mobile application is operating. Additionally, or alternatively, the mobile dashboard may include information identifying a country of origin for malicious attacks, a type of malicious attack, a protection level classification for the mobile application, or the like. For example, the threat analysis cloud platform may generate a risk assessment score relating to the detected malicious attacks, and may cause a classification associated with the risk assessment score (e.g., a "vulnerable" classification) to be provided for display via the monitoring dashboard. In this way, the threat analysis cloud platform enables a developer to identify potential vulnerabilities in the mobile application that correspond to an increased frequency of malicious attacks. For example, the threat analysis cloud platform may provide information indicating that a first operating system is more susceptible to malicious attacks relative to a second operating system, which may indicate a vulnerability with the first operating system. Based on detecting a user interaction with the security tool user interface, the threat analysis cloud platform may provide information identifying a set of recommendations relating to the set of malicious attacks. For example, the threat analysis cloud platform may determine to cause user devices to upgrade from the first operating system to the second operating system to reduce a vulnerability of the mobile application to malicious attacks.

Figure 1D:
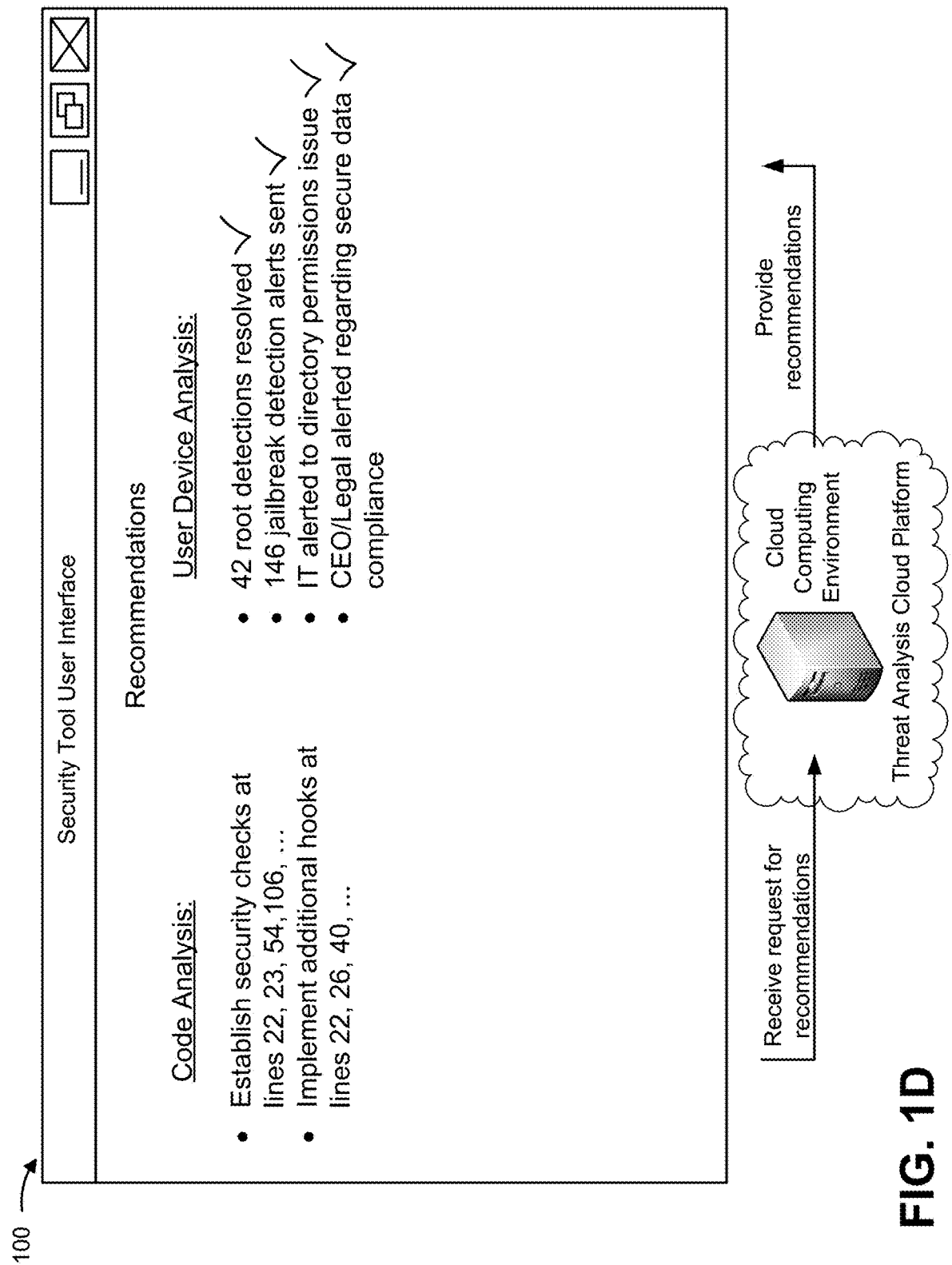

As shown in FIG. 1D, the threat analysis cloud platform may provide the set of recommendations for display via the security tool user interface. In some implementations, the cloud server may automatically analyze the mobile application being executed on a user device, and which is the subject of a malicious attack to identify a vulnerability of the mobile application, such as insecure data storage, insufficient transport layer protection, non-functioning cryptography, or the like. For example, based on performing a code analysis, the threat analysis cloud platform may recommend modifying the program code to include security elements (e.g., security checks, authentication requirements, etc.), additional hooks (e.g., to improve monitoring of a portion of program code), or the like at particular areas of the program code.

In some implementations, the threat analysis cloud platform may generate an incident response plan for future malicious attacks, and may cause a response action of the incident response plan to be performed. For example, the threat analysis cloud platform may determine that when malicious attacks are occurring at greater than a threshold rate, a rollback of an update to the mobile application is to be triggered, and may subsequently automatically roll back the update to the mobile application based on detecting that the rate of malicious attacks satisfies the threshold. Additionally, or alternatively, the threat analysis cloud platform may automatically utilize a malicious attack resolution tool to resolve a set of root detections, a set of jailbreak detections, or the like. Additionally, or alternatively, the threat analysis cloud platform may transmit a notification to an IT professional to indicate a directory permissions issue. Additionally, or alternatively, the threat analysis cloud platform may transmit a notification to a manager (e.g., a chief executive officer (CEO), a compliance officer, a legal department, etc.) regarding compliance with a data security standard (e.g., to automatically initiate mandatory reporting of a data breach).

In this way, based on performing active monitoring of mobile applications using hooks integrated into the mobile applications, the threat analysis cloud platform reduces a likelihood of success of future malicious attacks relative to mobile applications for which active monitoring does not occur. Based on reducing a likelihood of success of future malicious attacks, the threat analysis cloud platform reduces a utilization of computing resources by the user devices resulting from the malicious attacks, a utilization of network resources relating to exfiltrating data associated with the malicious attacks, and a user experience of users of the mobile applications.

As indicated above, FIGS. 1A-1D are provided merely as examples. Other examples are possible and may differ from what was described with regard to FIGS. 1A-1D.

Figure 2:
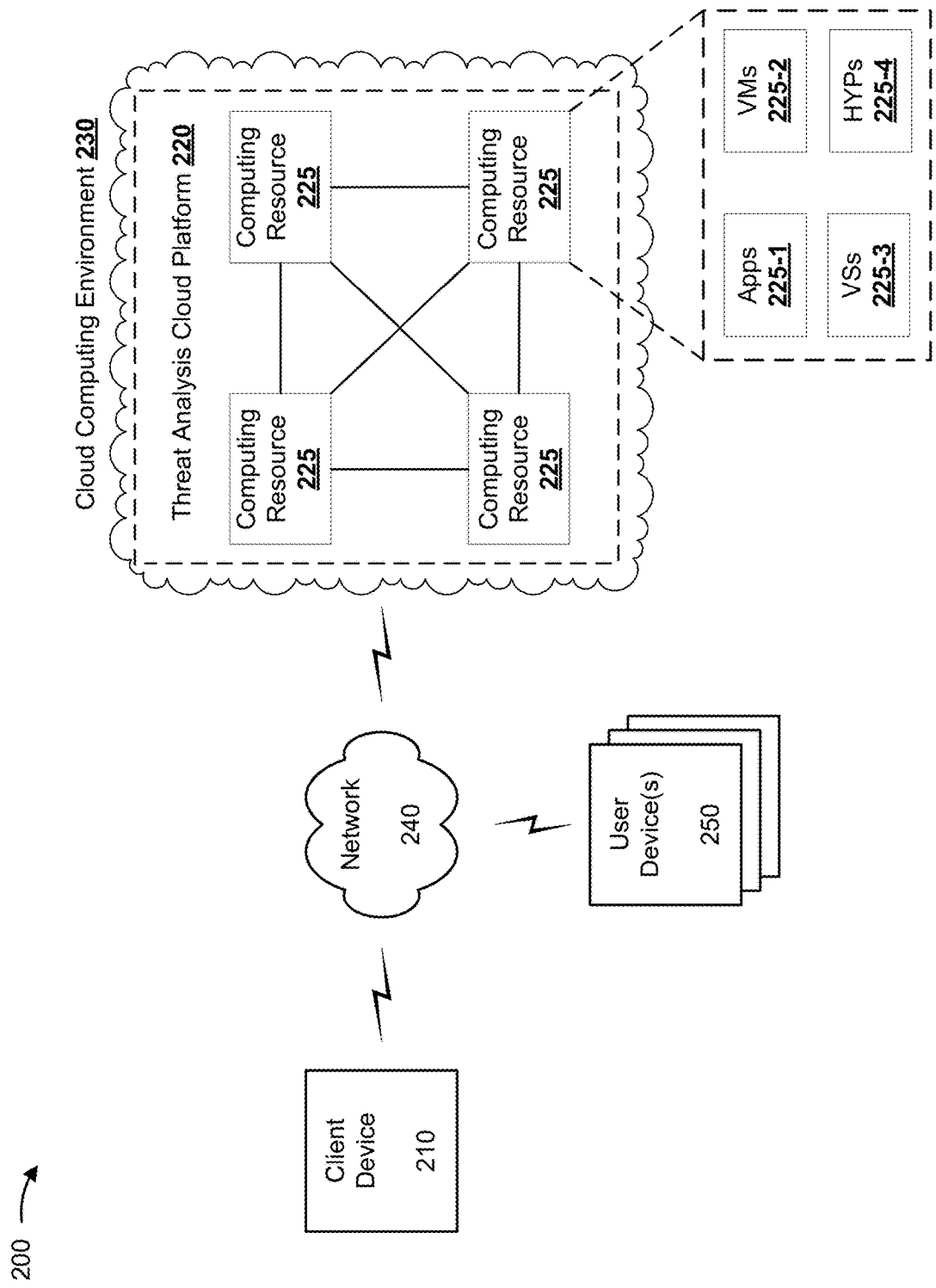
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, threat analysis cloud platform 220 hosted within cloud computing environment 230, network 240, and/or one or more user devices 250 (hereinafter referred to collectively as "user devices 250," and individually as "user device 250"). Devices of environment 200 may interconnect via wired connections, wireless connections, and/or a combination of wired and wireless connections.

Client device 210 includes one or more devices capable of receiving, storing, processing, and/or providing information associated with detection, analysis, and/or resolution of a malicious attack. For example, client device 210 may include a communication and/or computing device, such as a mobile phone (e.g., a smart phone, a radiotelephone, etc.), a computer (e.g., a laptop computer, a desktop computer, a tablet computer, a handheld computer, etc.), a gaming device, a wearable communication device (e.g., a smart wristwatch, a pair of smart eyeglasses, etc.), or a similar type of device.

Threat analysis cloud platform 220 includes one or more devices capable of receiving, generating, storing, classifying, processing, and/or providing information associated with detection, analysis, and/or resolution of a malicious attack. For example, threat analysis cloud platform 220 may include a cloud server or a group of cloud servers. In some implementations, threat analysis cloud platform 220 may communicate with user devices 250 to obtain information regarding a malicious attack, information regarding a particular user device 250, information regarding a mobile application operating on the particular user device 250, or the like.

In some implementations, as shown, threat analysis cloud platform 220 may be hosted in cloud computing environment 230. Notably, while implementations described herein describe threat analysis cloud platform 220 as being hosted in cloud computing environment 230, in some implementations, threat analysis cloud platform 220 may not be cloud-based (i.e., may be implemented outside of a cloud computing environment) or may be partially cloud-based.

Cloud computing environment 230 includes an environment that hosts threat analysis cloud platform 220. Cloud computing environment 230 may provide computation, software, data access, storage, and/or other services that do not require end-user knowledge of a physical location and configuration of system(s) and/or device(s) that host threat analysis cloud platform 220. As shown, cloud computing environment 230 may include a group of computing resources 225 (referred to collectively as "computing resources 225" and individually as "computing resource 225").

In some implementations, one or more cloud computing resources may be collocated in cloud computing environment 230. Additionally, or alternatively, one or more cloud computing resources may be hosted in another cloud computing environment that may communicate with cloud computing environment 230. Integrating multiple tools designed for different aspects of detection, analysis, and/or resolution of a malicious attack (e.g., R based statistical tools for statistical analysis, cloud computing resources for big data computing of millions, billions, or trillions of data points relating to malicious attacks, natural language processing tools for natural language interfacing with a developer, etc.), cloud computing environment 230 may enable threat analysis cloud platform 220 to effectively and automatically resolve malicious attacks, generate incident response plans to malicious attacks, generate and implement recommendations relating to the malicious attacks, etc. In this way, cloud computing environment 230 enables threat analysis cloud platform 220 to reduce a likelihood of success of future malicious attacks relative to anti-malicious attack software operating on a particular user device 250. Such improvements may result in a reduction of computing resources utilized by user device 250, a reduction in utilization of network resources resulting from a successful malicious attack on user device 250, or the like.

Computing resource 225 includes one or more personal computers, workstation computers, server devices, or another type of computation and/or communication device. In some implementations, computing resource 225 may host threat analysis cloud platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with threat analysis cloud platform 220 and/or any other software capable of being provided via cloud computing environment 230. In some implementations, one application 225-1 may transmit/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

User device 250 includes one or more devices capable of receiving, generating, storing, processing, and/or providing information associated with a mobile application. For example, user device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a machine type communication (MTC) device, an Internet of Things (IoT) device, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
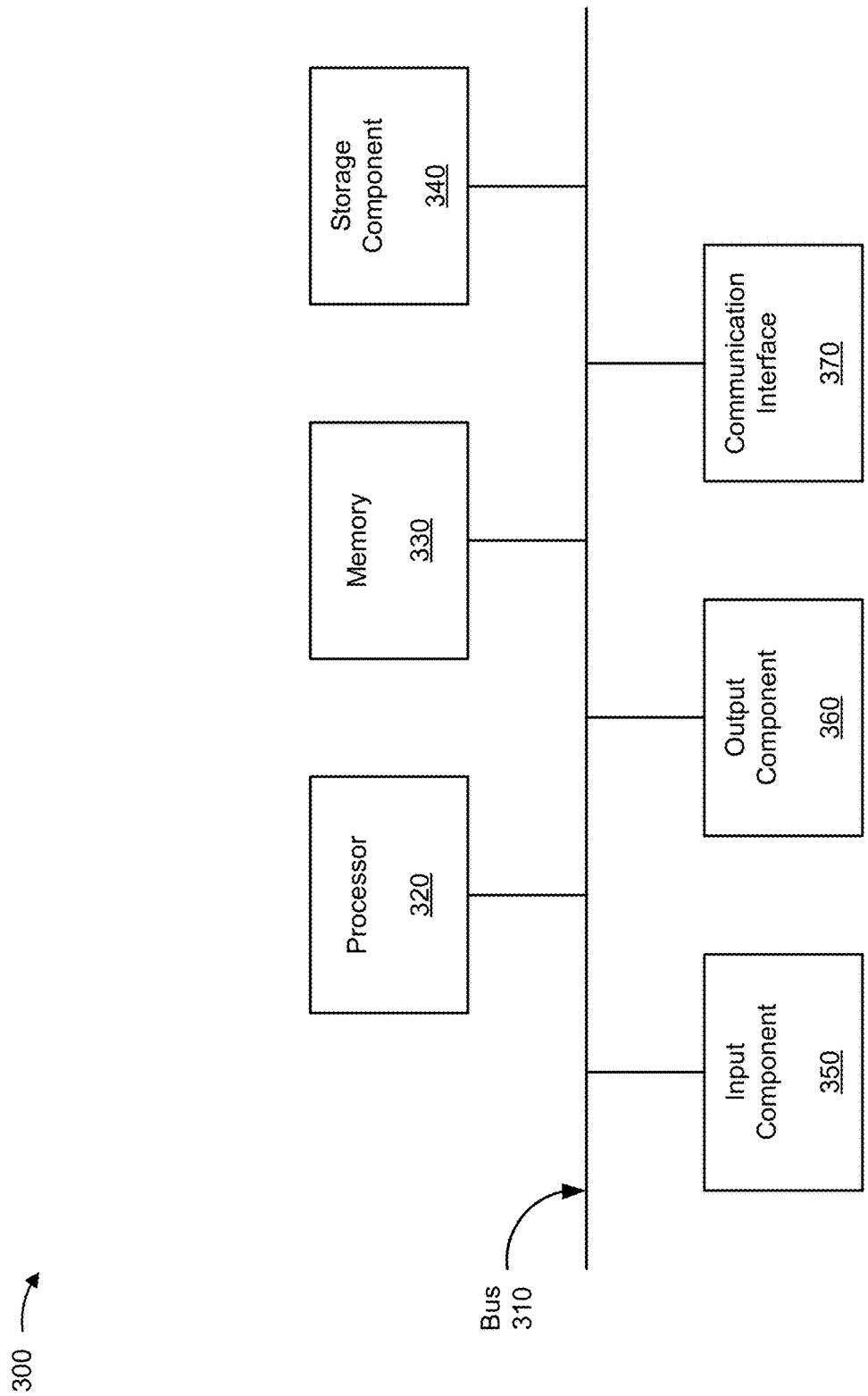
FIG. 3 is a diagram of example components of one or more devices of FIG. 2.

FIG. 3 is a diagram of example components of a device 300. Device 300 may correspond to client device 210, threat analysis cloud platform 220, and/or user device 250. In some implementations, client device 210, threat analysis cloud platform 220, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
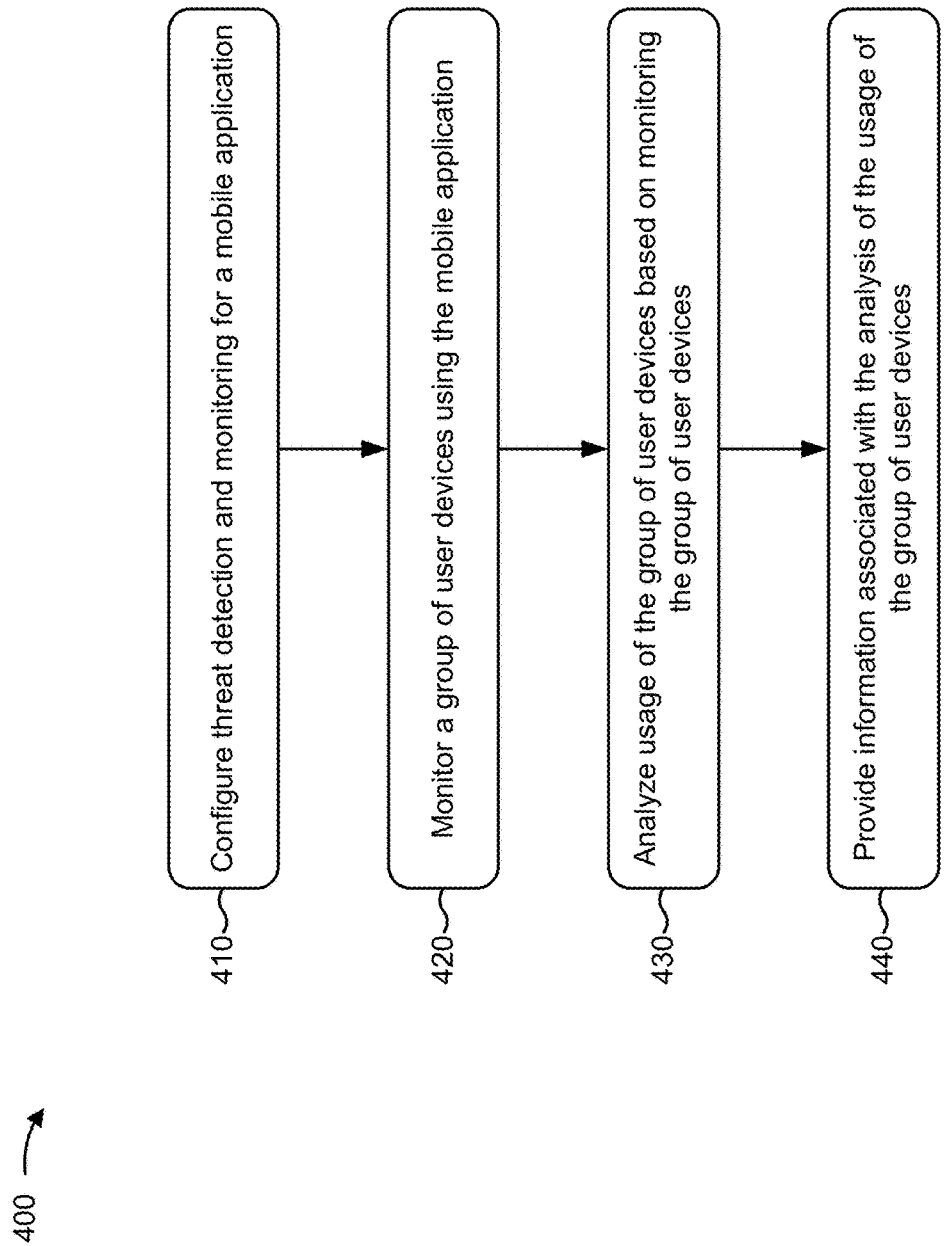
FIG. 4 is a flow chart of an example process for threat detection and response.

FIG. 4 is a flow chart of an example process 400 for threat detection and response. In some implementations, one or more process blocks of FIG. 4 may be performed by threat analysis cloud platform 220. In some implementations, one or more process blocks of FIG. 4 may be performed by another device or a group of devices separate from or including threat analysis cloud platform 220, such as client device 210 and/or user device 250.

As shown in FIG. 4, process 400 may include configuring threat detection and monitoring for a mobile application (block 410). For example, threat analysis cloud platform 220 may configure threat detection and monitoring for the mobile application. In some implementations, threat analysis cloud platform 220 may provide a configuration user interface to configure threat detection and monitoring for the mobile application. For example, threat analysis cloud platform 220 may provide a configuration view of a security tool user interface for display via client device 210 to receive user input regarding the mobile application, such as a type of mobile application, an operating system on which the mobile application is to operate, or the like.

In some implementations, threat analysis cloud platform 220 may provide an SDK for utilization in developing the mobile application. For example, threat analysis cloud platform 220 may provide a particular version of the SDK corresponding to a particular type of operating system on which the mobile application is to operate to client device 210 for use by a developer, a particular version of the SDK corresponding to a program code language used to develop the mobile application, or the like. In some implementations, threat analysis cloud platform 220 may automatically integrate aspects of the SDK into the mobile application. For example, threat analysis cloud platform 220 may automatically add a build path, a library, or the like associated with the SDK in the mobile application. Additionally, or alternatively, threat analysis cloud platform 220 may add a dependency for the SDK in the mobile application.

In some implementations, threat analysis cloud platform 220 may provide a secure identifier associated with the mobile application. For example, threat analysis cloud platform 220 may generate the secure identifier using a secure identifier generation technique, such as a hash technique, a pseudorandom number generation technique, or the like, and may provide the secure identifier for utilization in accessing information obtained regarding the mobile application using the SDK. In some implementations, threat analysis cloud platform 220 may configure a set of hooks or API calls associated with the SDK. For example, threat analysis cloud platform 220 may set hooks at a set of execution points of program code of the mobile application, and may utilize a set of API calls to cause information to be obtained and provided to threat analysis cloud platform 220 for analysis.

In this way, threat analysis cloud platform 220 may configure threat detection and monitoring for the mobile application.

As further shown in FIG. 4, process 400 may include monitoring a group of user devices using the mobile application (block 420). For example, threat analysis cloud platform 220 may monitor the group of user devices 250 that are using the mobile application. In some implementations, threat analysis cloud platform 220 may receive information regarding a set of vulnerabilities to malicious attacks associated with a subset of the group of user devices 250. For example, to detect a root vulnerability, threat analysis cloud platform 220 may access or communicate with a user device 250 to check whether test-keys are included in a build of an operating system of user device 250, which may indicate a developer build operating system or an unofficial build operating system. Similarly, threat analysis cloud platform 220 may access or communicate with user device 250 to monitor for over the air (OTA) certificates, a lack of which may indicate that a root vulnerability is present.

As another example, to detect a root based vulnerability, threat analysis cloud platform 220 may access or communicate with user device 250 to identify a particular type of package which indicates an increased likelihood of a presence of a root vulnerability (e.g., which may be determined based on analyzing previous malicious attacks associated with confirmed root vulnerabilities). In this case, threat analysis cloud platform 220 may monitor a binary file, a set of installed applications, or the like. For example, threat analysis cloud platform 220 may analyze an application quarantine to identify a presence of a package corresponding to a root vulnerability. Similarly, threat analysis cloud platform 220 may access or communicate with user device 250 to determine a presence of an open source operating system associated with a root vulnerability, such as by identifying a set of activities, binaries, or the like corresponding to the open source operating system. Similarly, threat analysis cloud platform 220 may access or communicate with user device 250 to determine a presence of a set of tools indicating a presence of a root vulnerability, such as a set of embedded Linux tools. In this way, threat analysis cloud platform 220 may determine whether a root modification has been performed on user device 250, which may indicate a potential root vulnerability. Moreover, based on identifying the root modification, threat analysis cloud platform 220 improves threat detection of malicious attacks relative to another technique that does not monitor for root modification.

Additionally, or alternatively, to detect a jailbreak based vulnerability of user device 250, threat analysis cloud platform 220 may access or communicate with user device 250 to identify a presence of a set of files determined to be associated with a jailbreak. For example, based on analyzing a set of jailbroken user devices 250 to identify common files associated with jailbreaking a particular user device 250, threat analysis cloud platform 220 may attempt to locate one or more of the files on a user device 250 to identify a jailbreak. Additionally, or alternatively, threat analysis cloud platform 220 may access or communicate with user device 250 to identify a set of permissions, a size of a particular file, a read/write permission for the particular file, or the like that indicates that user device 250 is jailbroken. In this way, user device 250 may identify vulnerabilities to malicious attacks associated with jailbroken user devices 250, which may be poorly accounted for by operating system based malicious attack detection techniques.

In some implementations, threat analysis cloud platform 220 may monitor other information relating to the mobile application and/or user device 250. For example, threat analysis cloud platform 220 may perform an application scan (e.g., as a background process), monitor and log security breaches associated with the mobile application, etc. Additionally, or alternatively, threat analysis cloud platform 220 may utilize hooks configured for the mobile application to monitor execution steps, calls, functions, etc. associated with the mobile application to detect a potential malicious attack. Similarly, threat analysis cloud platform 220 may monitor user device 250 and/or parse program code of the mobile application operating on user device 250 for satisfaction of a set of criteria corresponding to vulnerability to a malicious attack, such as a data security based vulnerability (e.g., data being transmitted without encryption), a network connection based vulnerability (e.g., connection to an unsecured (i.e., public) Wi-Fi network), an operating system based vulnerability (e.g., use of an operating system that is outdated (i.e., that is not a most recent updated version of the operating system), use of an operating system with known vulnerabilities, etc.), a mobile application based vulnerability (e.g., installation of another mobile application that is unverified from outside of an application store (app store) environment, installation of an application while operating in a debugging mode, installation of a mobile application via a wired connection, etc.), or the like.

In this way, threat analysis cloud platform 220 may monitor the group of user devices using the mobile application.

As further shown in FIG. 4, process 400 may include analyzing usage of the group of user devices based on monitoring the group of user devices (block 430). For example, threat analysis cloud platform 220 may analyze usage of the group of user devices 250 based on monitoring the group of user devices 250. In some implementations, threat analysis cloud platform 220 may automatically analyze a mobile application being executed on a user device, and which is the potential subject of a malicious attack to identify a vulnerability of the mobile application, such as insecure data storage, insufficient transport layer protection, non-functioning cryptography, or the like. For example, based on detecting a malicious attack directed toward user device 250, threat analysis cloud platform 220 may analyze user device 250 and/or the mobile application to identify a vulnerability associated with the malicious attack. In some implementations, threat analysis cloud platform 220 may utilize a big data technique to analyze tens of thousands, hundreds of thousands, millions, hundreds of millions, or billions of data points regarding malicious attacks to identify common vulnerabilities to malicious attacks. In some implementations, threat analysis cloud platform 220 may proactively identify a malicious attack and cause one or more response actions to be performed to mitigate an impact of the malicious attack.

In some implementations, threat analysis cloud platform 220 may classify a set of malicious attacks based on information identifying the usage of the group of user devices 250. For example, threat analysis cloud platform 220 may classify a malicious attack based on a channel for a malicious attack (e.g., a type of exploit used for the malicious attack, a type of vector through which the malicious attack is provided to a user device 250, etc.), a particular malicious attacker, an attack signature for the malicious attack, a pattern for a malicious attack, or the like. In this case, threat analysis cloud platform 220 may obtain information regarding resolutions to malicious attacks associated with the identified channel, the particular malicious attacker, the attack signature, the pattern, or the like.

In some implementations, threat analysis cloud platform 220 may obtain historical malicious attack data to categorize the set of malicious attacks based on similar historical malicious attacks. For example, based on classifying the set of malicious attacks into a particular type, threat analysis cloud platform 220 may obtain historical data regarding similar types of malicious attacks to identify a vulnerability associated with the malicious attack. In this case, threat analysis cloud platform 220 may utilize machine learning, pattern recognition, heuristics, or the like to identify patterns in the historical data that indicate a resolution to the malicious attack, a portion of the mobile application that is to be altered to reduce a threat of the malicious attack, an incident response plan associated with a similar malicious attack that is to be modified for use with the malicious attack, or the like.

In some implementations, threat analysis cloud platform 220 may generate a score indicating a similarity between malicious attacks. For example, threat analysis cloud platform 220 may assess malicious attacks based on a set of criteria, such as a source, a target, a type, a channel, a purpose, etc., and may assign weights to the set of criteria to score malicious attacks based on similarity. In this case, based on a threshold similarity score, threat analysis cloud platform 220 may select a resolution for a malicious attack that has been successfully implemented for another malicious attack. For example, when a first malicious attack is associated with a threshold similarity to a second malicious attack, and a resolution exists for mitigating the second malicious attack, threat analysis cloud platform 220 may select the resolution for the first malicious attack.

In some implementations, threat analysis cloud platform 220 may generate risk assessment scores for the set of malicious attacks. For example, threat analysis cloud platform 220 may determine a score relating to a level of risk from the malicious attack based on a set of criteria, such as a likelihood of occurrence of the malicious attack, a likelihood of success of the malicious attack, a value associated with a disruption caused by the malicious attack (e.g., a value of data lost, a value of computing resources wasted, etc.), or the like. In some implementations, threat analysis cloud platform 220 may combine multiple risk assessment scores associated with multiple malicious attacks common to the mobile application to generate a risk assessment score for the mobile application. In this case, threat analysis cloud platform 220 may categorize the mobile application based on the risk assessment score for the mobile application.

In some implementations, threat analysis cloud platform 220 may generate an incident response plan for future malicious attacks. For example, based on an identification of attacker behavior (e.g., where a malicious attack comes from, what channels convey the malicious attack, whether the malicious attack comes from repeating source (e.g., a common attacker, a common country, a common computer, a common malware, etc.), which vulnerabilities of the mobile application are being targeted, what type of attack is being performed), threat analysis cloud platform 220 may generate an incident response plan indicating a set of response actions that are to be performed to reduce a likelihood of success of future malicious attacks similar to malicious attacks that have been identified. For example, based on determining that malicious attacks occur via a common channel or attack a common vulnerability, threat analysis cloud platform 220 may generate a recommendation relating to blocking the channel, modifying (e.g., reducing or eliminating) the vulnerability, or the like. In some implementations, threat analysis cloud platform 220 may automatically implement the recommendation without human input, such as by communicating with one or more user devices 250, as described herein.

In this way, threat analysis cloud platform 220 may analyze usage of the group of user devices based on monitoring the group of user devices.

As further shown in FIG. 4, process 400 may include providing information associated with the analysis of the usage of the group of user devices (block 440). For example, threat analysis cloud platform 220 may provide information associated with the analysis of the usage of the group of user devices 250. In some implementations, threat analysis cloud platform 220 may generate a user interface to provide the information associated with the analysis. For example, threat analysis cloud platform 220 may generate the security tool user interface to include a set of metrics, classifications, and/or recommendations regarding the analysis of the malicious attacks. In some implementations, threat analysis cloud platform 220 may generate the set of recommendations based on the analysis. For example, threat analysis cloud platform 220 may determine that a particular type of malicious attack is associated with a threshold likelihood of occurring based on the attacker behavior (e.g., based on determining that a particular vulnerability exists for the mobile application, that the mobile application is being operated on outdated operating systems, that the mobile application is being operated on jailbroken operating systems, etc.), and may select a recommendation associated with resolving another malicious attack determined to be similar. In this case, threat analysis cloud platform 220 may recommend a modification to program code of the mobile application, a modification to utilization of the SDK, a set of procedures relating to notifying stakeholders regarding a malicious attack, or the like.

In some implementations, threat analysis cloud platform 220 may automatically implement one or more response actions of the incident response plan. For example, threat analysis cloud platform 220 may analyze a similar mobile application stored via a data structure to identify a code segment to replace a code segment of the mobile application that is associated with the vulnerability (e.g., threat analysis cloud platform 220 may replace an erroneously coded pseudorandom number generator with a correctly coded pseudorandom number generator to fix an authentication issue that utilizes pseudorandom number generation). Additionally, or alternatively, threat analysis cloud platform 220 may automatically disable the mobile application on one or more user devices 250. In this way, threat analysis cloud platform 220 may reduce a likelihood that a malicious attack can use the mobile application to access the one or more user devices 250. Additionally, or alternatively, threat analysis cloud platform 220 may automatically disable another application (e.g., another application that causes a vulnerability with the mobile application). In this way, threat analysis cloud platform 220 may stop functioning of a vulnerable application of a malware application without stopping functioning of the mobile application.

Additionally, or alternatively, threat analysis cloud platform 220 may automatically cause an update to be provided to one or more user devices 250, such as an update to the mobile application, an update to an operating system, an update to a firewall application, an update to another application that interacts with the mobile application, or the like. In this way, threat analysis cloud platform 220 may block an exploit using the update. Additionally, or alternatively, threat analysis cloud platform 220 may simulate activity via the mobile application, and may monitor output of the simulated activity. In this way, threat analysis cloud platform 220 may collect additional data regarding operation of the malicious software. Additionally, or alternatively, threat analysis cloud platform 220 may automatically generate a fix for an identified vulnerability, and may provide the fix for developer review and/or approval. In this way, threat analysis cloud platform 220 may reduce an amount of time to fix the vulnerability.

Additionally, or alternatively, threat analysis cloud platform 220 may automatically transmit a set of notifications to a set of stakeholders regarding a malicious attack (e.g., based on detecting a future malicious attack), thereby initiating incident response more rapidly relative to a manual technique for initiating incident response, and reducing a potential damage of the malicious attack. Additionally, or alternatively, threat analysis cloud platform 220 may perform automatic compliance procedures, such as by logging exposed data resulting from a malicious attack and providing a notification to a set of affected stakeholders identifying the exposed data.

In this way, threat analysis cloud platform 220 may provide information associated with the analysis of the usage of the group of user devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, threat analysis cloud platform 220 may obtain information regarding mobile applications to detect vulnerabilities, thereby reducing a likelihood of success of subsequent malicious attacks relative to remediating malicious attacks without performing further analysis. Moreover, threat analysis cloud platform 220 reduces utilization of computing resources by user devices 250 by reducing a likelihood that future malicious attacks are successful and cause excess and unwanted utilization of computing resources by user devices 250. Furthermore, threat analysis cloud platform 220 reduces a likelihood of malicious data exfiltration as a result of future malicious attacks, thereby reducing a utilization of network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
communicate with a set of user devices operating a set of mobile applications to obtain data regarding a set of malicious attacks associated with the set of user devices;
store the data regarding the set of malicious attacks via a data structure for analysis;
process the stored data to identify one or more vulnerabilities associated with the set of user devices or the set of mobile applications;
generate a security tool user interface that includes information identifying the one or more vulnerabilities associated with the set of user devices or the set of mobile applications,
the security tool user interface including information identifying a risk assessment score relating to the one or more vulnerabilities,
the security tool user interface including information associated with performing one or more response actions to improve the risk assessment score;
cause the security tool user interface to be provided for display via a client device based on generating the security tool user interface;
generate a recommendation relating to improving the risk assessment score based on processing the stored data,
the recommendation relating to a modification to the set of mobile applications;
communicate with one or more other devices to create an updated version of the set of mobile applications by modifying program code of the set of mobile applications; and
communicate with the set of user devices to provide the updated version of the set of mobile applications.

2. The device of claim 1, where the one or more processors are further to:
classify a malicious attack, of the set of malicious attacks, based on a channel of the malicious attack, an attack signature of the malicious attack, a pattern of the malicious attack, or a source of the malicious attack; and
include, in the security tool user interface, information identifying the malicious attack based on classifying the malicious attack.

3. The device of claim 1, where the one or more processors are further to:
include, in the security tool user interface, the recommendation relating to improving the risk assessment score.

4. The device of claim 1, where the recommendation relates to implementation of an incident response plan; and where the one or more processors, when communicating with the one or more other devices, are to:
communicate with the one or more other devices to identify the incident response plan; and
communicate with the one or more other devices as a response to detecting a trigger relating to the incident response plan to provide a notification relating to the trigger.

5. The device of claim 1, where the one or more processors, when processing the stored data to identify the one or more vulnerabilities, are to:
determine that a user device, of the set of user devices, is associated with at least one of:
a root based vulnerability,
a jailbreak based vulnerability,
a data security based vulnerability,
a network connection based vulnerability,
an operating system based vulnerability, or
a mobile application based vulnerability.

6. The device of claim 1, where the one or more processors are further to:
cause, based on a user interaction with a user interface element of the security tool user interface, a software development kit (SDK) to be downloaded to a mobile application of the set of mobile applications.

7. The device of claim 6, where the one or more processors are further to:
cause, based on the user interaction with the user interface element of the security tool user interface, the SDK to be loaded into an integrated development environment (IDE) associated with the mobile application.

8. A non-transitory computer-readable medium storing instructions, the instructions comprising:
one or more instructions that, when executed by one or more processors, cause the one or more processors to:
configure monitoring of a set of user devices using a mobile application;
communicate with the set of user devices using the mobile application to obtain data regarding a set of malicious attacks associated with the set of user devices;
store the data regarding the set of malicious attacks via a data structure for analysis;
process the stored data to identify one or more vulnerabilities associated with the set of user devices or the mobile application;
generate a security tool user interface that includes information identifying the one or more vulnerabilities associated with the set of user devices or the mobile application,
the security tool user interface including information identifying a risk assessment score relating to the one or more vulnerabilities,
the security tool user interface including information associated with performing one or more response actions to improve the risk assessment score;
cause the security tool user interface to be provided for display via a client device based on generating the security tool user interface;
generate a recommendation relating to improving the risk assessment score based on processing the stored data,
the recommendation relating to a modification to the mobile application;
communicate with one or more other devices to create an updated version of the mobile application by modifying program code of the mobile applications; and
communicate with the set of user devices to provide the updated version of the mobile application.

9. The non-transitory computer-readable medium of claim 8, where the one or more instructions, when executed by the one or more processors, further cause the one or more processors to:
classify a malicious attack, of the set of malicious attacks, based on a channel of the malicious attack, a pattern of the malicious attack, or a source of the malicious attack; and
include, in the security tool user interface, information identifying the malicious attack based on classifying the malicious attack.

10. The non-transitory computer-readable medium of claim 8, where the one or more instructions, when executed by the one or more processors, cause the one or more processors to:
include, in the security tool user interface, the recommendation relating to reducing the risk assessment score.

11. The non-transitory computer-readable medium of claim 8, where the one or more instructions, when executed by the one or more processors, cause the one or more processors to:
provide a configuration user interface for display via the client device to configure the monitoring of the set of user devices.

12. The non-transitory computer-readable medium of claim 8, where the one or more instructions, when executed by the one or more processors, further cause the one or more processors to:
cause, based on a user interaction with a user interface element of the security tool user interface, a software development kit (SDK) to be downloaded to the mobile application; and
cause, based on the user interaction with the user interface element of the security tool user interface, the SDK to be loaded into an integrated development environment (IDE) associated with the mobile application.

13. A method, comprising:
communicating, by a device, with a set of user devices operating a set of mobile applications to obtain data regarding a set of malicious attacks associated with the set of user devices;
storing, by the device, the data regarding the set of malicious attacks via a data structure for analysis;
processing, by the device, the stored data to identify one or more vulnerabilities associated with the set of user devices or the set of mobile applications;
generating, by the device, a security tool user interface that includes information identifying the one or more vulnerabilities associated with the set of user devices or the set of mobile applications,
the security tool user interface including information identifying a risk assessment score relating to the one or more vulnerabilities, and
the security tool user interface including information associated with performing one or more response actions to improve the risk assessment score;
causing, by the device, the security tool user interface to be provided for display via a client device based on generating the security tool user interface;

generating, by the device, a recommendation relating to improving the risk assessment score based on processing the stored data,
the recommendation relating to a modification to the set of mobile applications;
communicating, by the device, with one or more other devices to create an updated version of the set of mobile applications by modifying program code of the set of mobile applications; and
communicating, by the device, with the set of user devices to provide the updated version of the set of mobile applications.

14. The method of claim 13, further comprising:
classifying a malicious attack, of the set of malicious attacks, based on a channel of the malicious attack, an attack signature of the malicious attack, a pattern of the malicious attack, or a source of the malicious attack; and
including, in the security tool user interface, information identifying the malicious attack based on classifying the malicious attack.

15. The method of claim 13, further comprising:
including, in the security tool user interface, the recommendation relating to improving the risk assessment score.

16. The method of claim 13, where the recommendation relates to implementation of an incident response plan; and
where communicating with the one or more other devices comprises:
communicating with the one or more other devices to identify the incident response plan; and
communicating with the one or more other devices as a response to detecting a trigger relating to the incident response plan to provide a notification relating to the trigger.

17. The method of claim 13, where processing the stored data to identify the one or more vulnerabilities comprises:
determining that a user device, of the set of user devices, is associated with at least one of:
a root based vulnerability,
a jailbreak based vulnerability,
a data security based vulnerability,
a network connection based vulnerability,
an operating system based vulnerability, or
a mobile application based vulnerability.

18. The method of claim 13, further comprising:
providing a configuration user interface for display via the client device to configure monitoring of the set of user devices.

19. The method of claim 13, further comprising:
causing, based on user interaction with a user interface element of the security tool user interface, a software development kit (SDK) to be downloaded to a mobile application of the set of mobile applications.

20. The method of claim 19, further comprising:
causing, based on the user interaction with the user interface element of the security tool user interface, the SDK to be loaded into an integrated development environment (IDE) associated with the mobile application.

* * * * *